May 15, 1951   A. G. F. WALLGREN ET AL   2,553,222
SEALING MEANS FOR INTERNAL-COMBUSTION MOTORS
Filed April 24, 1946
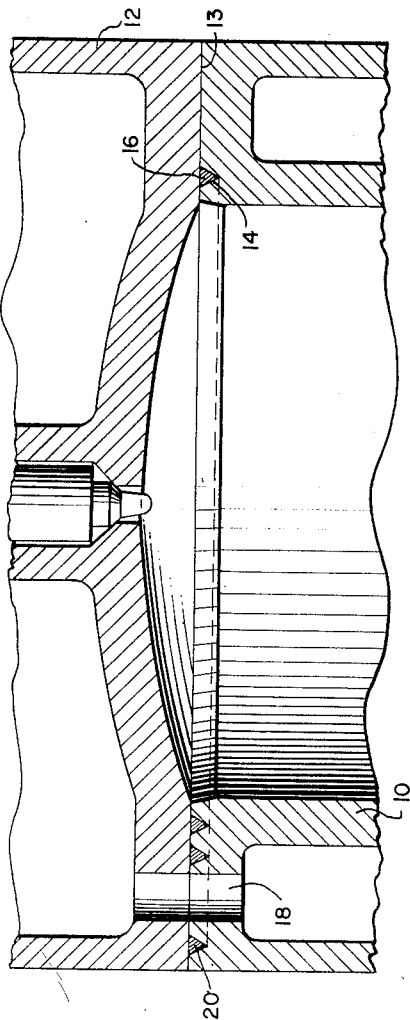
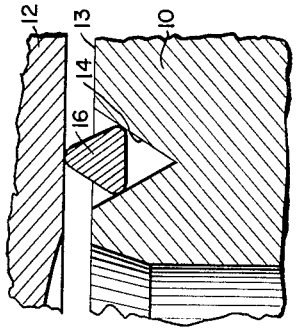
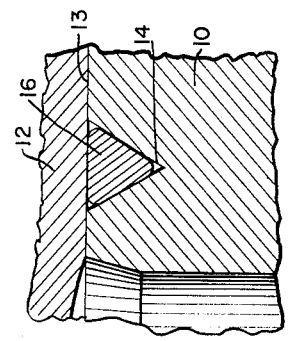
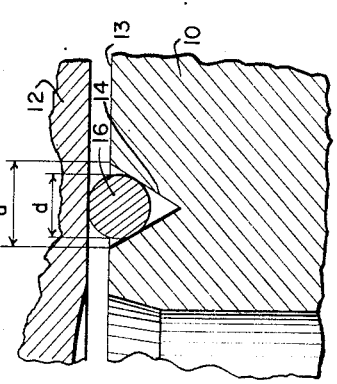
INVENTORS
AUGUST GUNNAR FERDINAND WALLGREN
AND KALEB EMIL EVRELL
By
ATTORNEY Patented May 15, 1951

2,553,222

UNITED STATES PATENT OFFICE 2,553,222

SEALING MEANS FOR INTERNAL-COMBUSTION MOTORS

August Gunnar Ferdinand Wallgren, Stockholm, and Kaleb Emil Evrell, Eskilstuna, Sweden Application April 24, 1946, Serial No. 664,666
In Sweden May 3, 1943

Section 1, Public Law 690, August 8, 1946
Patent expires May 3, 1963

6 Claims. (Cl. 123—193)

This invention relates to means for providing the seal between the cylinder and cylinder head of internal combustion engine. In practice packings of soft material are generally used for this purpose, such packings have to bear with a tight fit on the sealing surfaces between the cylinder and the head, when said elements are drawn together. In such cases the final thickness of the soft packing depends on the tightening force and the properties of the packing material, the result being that exact determination of the distance between the head and the cylinder cannot be obtained. This in turn has an influence, inter alia, on the volume of the combustion space, which varies from case to case, that is to say, it is beyond the control of the engine manufacturer, and consequently the engines may have different characteristics in general and unsatisfactory operating characteristics in particular. This disadvantage manifests itself particularly in full Diesel engines, wherein the combustion space is small at the end of the compression stroke. Another drawback of the known construction is that the plastic properties of the soft packing result in that the packing becomes thinner and harder every time the head is tightened, until it no longer affords a tight fit. It has also been suggested to make the plastic packing in the form of a ring inserted into a groove in the cylinder. This construction does not provide a satisfactory solution of the problem, among other things owing to a permanent deformation of the packing, which thus becomes loose in this case also after the head has been applied and taken off a few times.

The present invention therefore aims to provide a new and improved form of packing, which maintains perfect sealing properties even after the head and the cylinder have been assembled and disassembled a number of times.

Further objects and advantages of the invention will be apparent from the following description considered in connection with the accompanying drawing, which form a part of this specification, and of which:

Fig. 1 shows a longitudinal section of portions of the cylinder and the head of a Diesel engine with packing means made according to the invention.

Figs. 2–4 show a portion of the section of Fig. 1 on an enlarged scale with the plastic packing ring in three different stages of mounting.

In the drawing 10 designates a portion of a cylinder of a Diesel engine and 12 a portion of a cylinder head, which is tightened on the cylinder in any known manner, for instance by means of bolts (not shown). In the plane surface 13 of the cylinder facing the head there is provided an annular groove 14, which extends round the cylinder bore, and the width of which diminishes inwardly into the cylinder material, said groove being preferably of an angular cross section. The inclination between the walls of the groove may vary within suitable limits; in the embodiment shown the angle between these walls is 60°. Said walls form together with the plane extending through the surface 13, an equilateral triangle. On the other hand the surface of the cylinder 12 extending adjacent to the groove 14 is plane.

An endless packing ring 16, for instance of copper, is inserted into the groove 14. Prior to its use the packing may have a circular cross section, as will appear from Fig. 2. The head is tightened so as to abut against the cylinder 10, and at the same time the packing is deformed to the shape shown in Fig. 3. The packing 16 follows at a high surface pressure the outline of the contact surfaces against the wedge groove 14 and the plane surface of the head, so that a perfect tightening effect is obtained. When the head is again to be applied after having been taken off, the packing 16 is reversed, as shown in Fig. 4. The previously downwardly directed point of the packing deformed to a triangle will now protrude upwardly above the wedge groove 14, and when the head is applied anew, the packing is again subjected to such deformation that it assumes the shape of the contact surfaces against the cylinder and the head, thus ensuring a perfect sealing effect. Even now, after the head has been tightened, the reversed packing ring 16 takes the shape shown in Fig. 3.

In Fig. 1, 18 denotes one of the passages connecting the cooling water jackets of the cylinder 10 and of the head 12 with each other. Arranged about this passage a packing ring 20 is inserted between the cover and a groove in the cylinder, in the manner above described.

It will be seen from the above that the contact surfaces of the head and cylinder against the respective packing rings must not be a mirror image of each other. The greater the deviation from the mirror image, the greater is also the plastic deformation to which the packing ring must be subjected upon every reversal, with a consequent greater deformation in consequence thereto, when the head is tightened. In a tightened bond (Fig. 3), the packing ring 16 or 20 lies pressed against the contact surfaces at a pressure reaching approximately the elastic limit of the ring material. This facilitates selection of a ring material answering different requirements. Every time the packing ring is turned and deformed, it is subjected to cold working, which for such malleable metals as copper, aluminium, soft steel, etc., increases the hardness, by reason of which the ring may be brought to a softening red heat every time it is to be used anew.

According to the invention, the packing ring is preferably so dimensioned that its cross sectional area is smaller than that of the groove into which it is to be forced. On the other hand, the groove must not be made so large that the same would not effect a suitable deformation of the packing ring. In the above example with a packing ring of round section (Fig. 2) and with a wedge groove which, when the head is tightened, forms an equilateral triangle in cross section (Fig. 3), the limits of the dimension of the groove are determined according to $$\frac{d\sqrt{\pi}}{\sqrt[4]{3}} < a < d\sqrt{3}$$

where $d$ is the diameter of the cross section of the packing ring and $a$ the side of the equilateral triangle, the limits on the one hand fulfilling the condition that the cross sectional area of the ring be less than that of the groove and on the other hand fulfilling the condition that the diameter of the ring be greater than that of the inscribed circle of the triangle.

While one more or less specific embodiment of the invention has been shown, it is to be understood that this is for purpose of illustration only and that the invention is not to be limited thereby, but its scope is to be determined by the appended claims.

What we claim is:

1. In an engine, a cylinder member and a head member, said members having confronting surfaces adapted to be brought together in abutting relation when the parts are assembled, a groove in one of said members, said groove having a closed perimeter and having walls converging toward the bottom of the groove and forming between them an acute angle at the marginal edges of the groove, the confronting surface of the other of said members opposite said groove having a contour different from that of the groove, and a circumferentially continuous packing ring of deformable plastic material in said groove, said packing ring being deformed in cross section to substantially conform to the cross section of the space between the confronting surfaces when the parts are brought together and in its deformed state having converging side surfaces complementary to the converging walls of the groove, whereby, upon disassembly of the parts and removal and replacement of the packing ring in reversed position, the direction of convergence of the side surfaces of the ring will be opposite that of the walls of the groove and the ring will be required to be plastically deformed in cross section to again conform substantially to the cross section of the space between the confronting surfaces when said members are again brought together in assembled position.

2. Apparatus as set forth in claim 1, in which the cross section of the groove is substantially an isosceles triangle.

3. Apparatus as set forth in claim 1, in which the cross section of the groove is substantially an equilateral triangle.

4. Apparatus as set forth in claim 1, in which the cross sectional area of the groove is greater than the cross sectional area of the packing ring when said members are brought together in abutting relation.

5. Apparatus as set forth in claim 1, in which the packing ring is of malleable metal.

6. Apparatus as set forth in claim 1, in which the packing ring is of annealed malleable metal.

AUGUST GUNNAR
FERDINAND WALLGREN.
KALEB EMIL EVRELL.

REFERENCES CITED

The following references are of record in the file of this patent:

UNITED STATES PATENTS

| Number | Name | Date |
| --- | --- | --- |
| 1,443,893 | Barrett | Jan. 30, 1923 |
| 1,503,741 | Almen | Aug. 5, 1924 |
| 1,814,283 | Braner | July 14, 1931 |
| 1,880,643 | Woolson | Oct. 4, 1932 |

FOREIGN PATENTS

| Number | Country | Date |
| --- | --- | --- |
| 2,843 | Great Britain | Nov. 12, 1861 |